3,319,653
FLOW CONTROL VALVES
William T. Stephens, Palatine, Ill., assignor to Borg-Warner Corporation, a corporation of Illinois
Filed Nov. 21, 1963, Ser. No. 325,429
5 Claims. (Cl. 137—596)

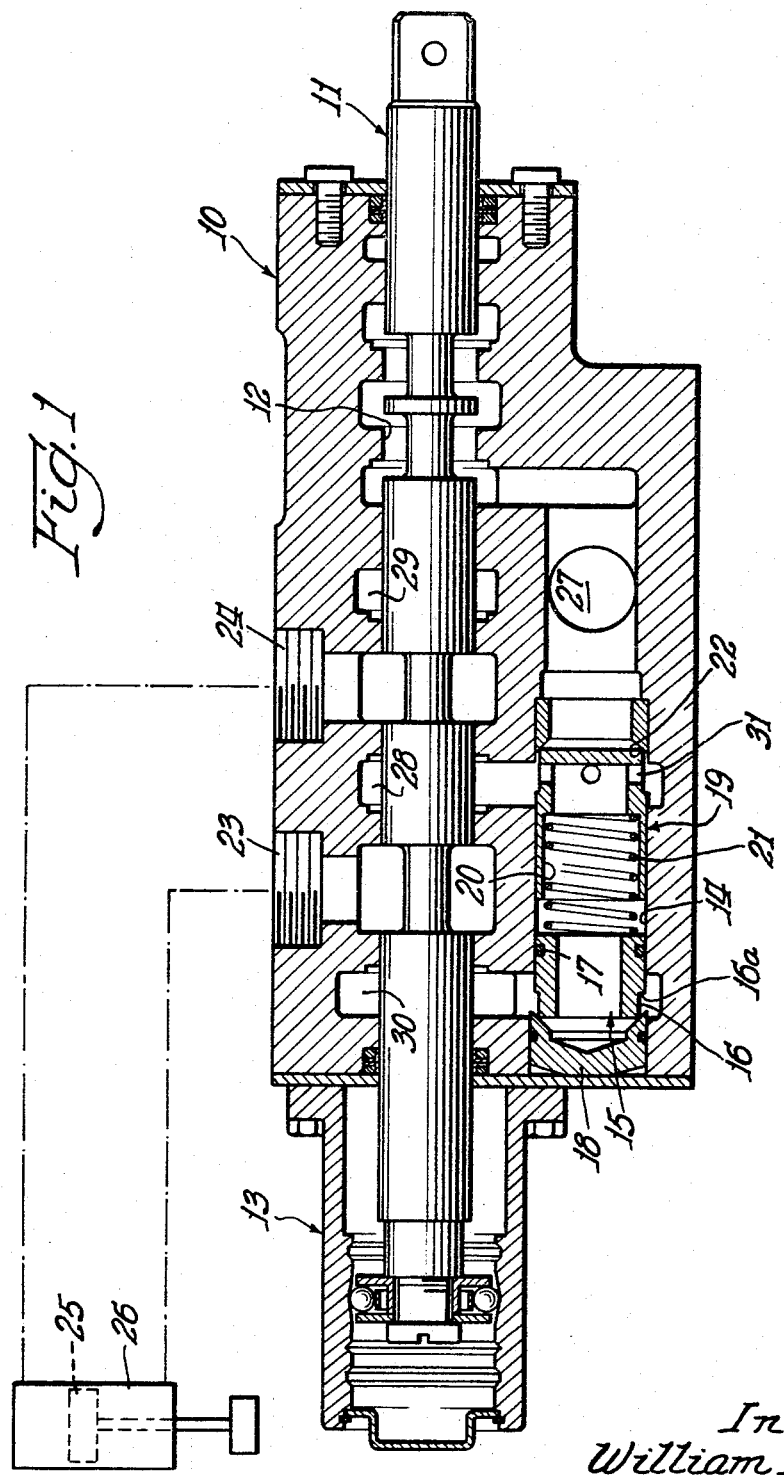
Inventor:
William T. Stephens

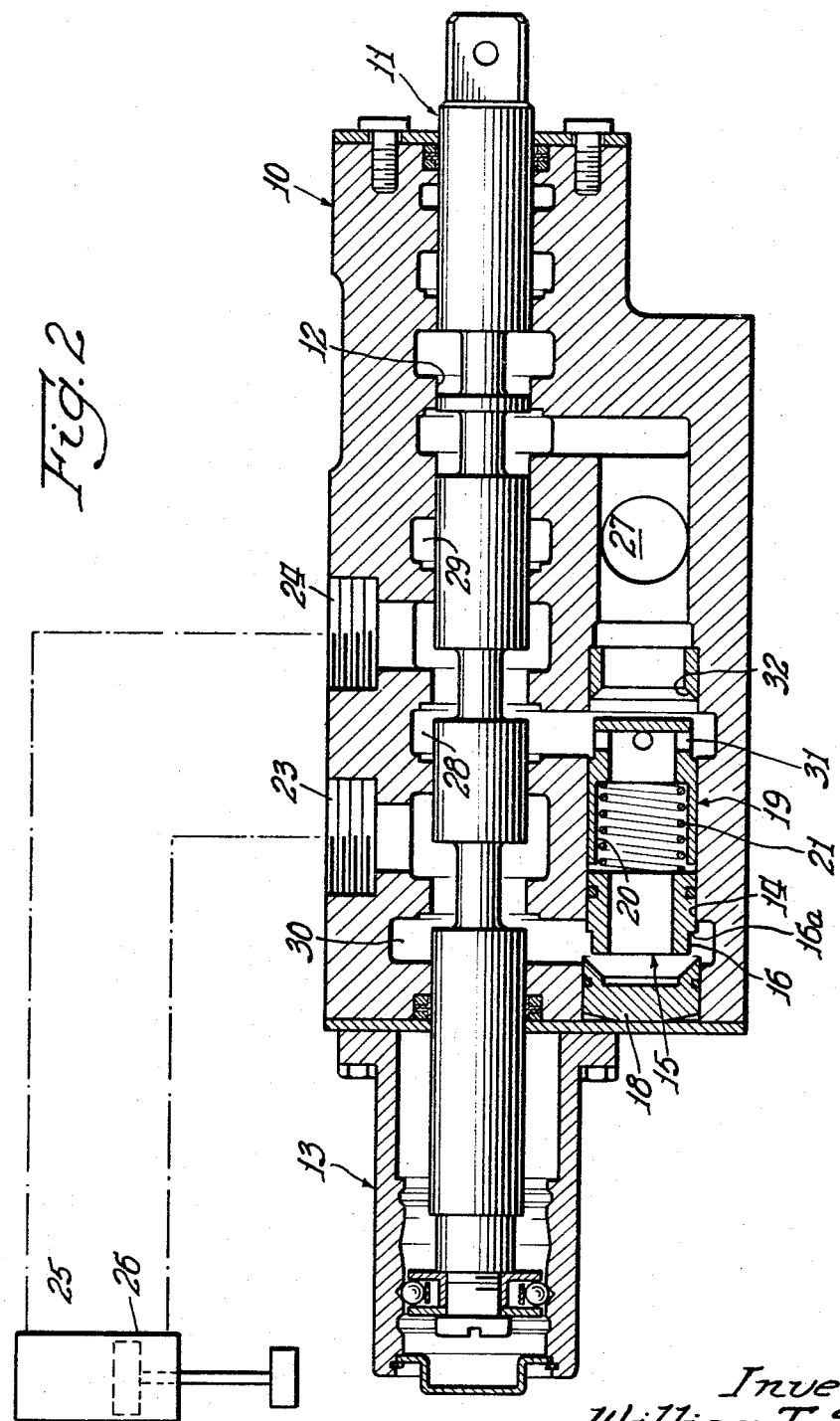

The present invention relates to flow control valves and more particularly to a spool valve means incorporating an integrally housed anticavitation valve and load check valve within the body of the valve wherein the return oil from the work cylinder is fed into the pump flow when negative pump pressure is indicated by the loading of the work cylinder. Other approaches with respect to anticavitation valve means are available. However, in all these instances the load check is not integrally housed or operable in the same chamber in which the anticavitation valve operates and this would entail additional cost as compared with the present invention.

The present invention further distinguishes from the prior art in that an anticavitation valve and load check is provided for each valve section in a multiple valve arrangement and the pressure to operate the anticavitation valve is individual to each valve spool.

A further distinction over the prior art resides in a unique arrangement which feeds the return oil through the anticavitation valve into the load check to join the pump fluid flow into the cylinder.

It is therefore an important object of the present invention to provide an improved anticavitation valve means which is located in an area adjacent the load check.

It is another important object of the present invention to provide an improved anticavitation valve means wherein the pressure to operate the anticavitation valve means is individual to each valve spool in a multiple valve arrangement.

It is also an important object of the present invention to provide an improved anticavitation means and load check which is comparatively low in manufacturing cost.

The invention consists of the novel constructions, arrangements and devices to be hereinafter described and claimed for carrying out the above stated objects as will be apparent from the following description of preferred form of the invention, illustrated with reference to the accompanying drawing, wherein:

FIGURE 1 is a cross section plan view of a spool valve in neutral position, showing an anticavitation valve and load check according to the present invention; and FIGURE 2 is the same view as shown in FIGURE 1, except that the spool is in the next detent position, forwardly.

Referring now to FIGURE 1, a valve body 10 is provided with a spool 11 reciprocally operable in a spool bore 12 and a detent housing 13.

The valve body 10 is also provided with an anticavitation and load check bore 14, having operably positioned therein, an anticavitation valve 15, in the form of an open ended cylinder provided with a reduced diameter 16 which thereby povides an annular shoulder 16a. A fluid sealing means, such as an O-ring 17, is provided around the perimeter of the anticavitation valve 15, forward of which a floating seat 18 is positioned in the anticavitation and load check bore 14.

A cylindrical load check 19 having a bore 20 therein is provided with a spring 21 interposed between the anticavitation valve 15 and the cylindrical load check 19 urging them into seating engagement with their respective seats, the floating seat 18 and a load check seat 22.

Fluid passages 23 and 24 are operably connected in fluid communication below and above a piston 25, respectively, which is operable in a work cylinder 26.

When the spool 11 is moved forwardly from the neutral position as shown in the drawing, a pump fluid passage 27 in fluid communication with a hydraulic pump, not shown, as its source of fluid under pressure, is connected in fluid communication with the work cylinder 26 in the area below the piston 25 by way of the anticavitation and load check bore 14, a fluid passage 28 and the fluid passage 23. When this occurs, the fluid in the work cylinder 26 above the piston 25 returns by way of the fluid passages 24 and 29 and thence back to a fluid reservoir, not shown. (Fluid communication between the fluid passage 29 and the fluid reservoir is provided by suitable passage fluid means, not shown.)

Conversely when the spool 11 is moved forward from neutral to its next detent position as shown in FIGURE 2, the pump fluid passage 27 is connected in fluid communication with the work cylinder 26 in the area above the piston 25 by way of the anticavitation and load check bore 14, and the fluid passages 28 and 24.

Under these circumstances the fluid in the cylinder 26 below the piston 25 returns to the fluid reservoir by way of the fluid passage 23, a fluid passage 30, the anticavitation and load check bore 14, thence, through openings 31 in the cylindrical load check 19, at which point this fluid mingles with the flow of the fluid from the fluid pump passage 27 into the fluid passages 28 and 24, thence into the cylinder 26 in the area above the work piston 25 if there is a vacuum in this area; if no vacuum exists tthe fluid returns to the fluid reservoir by way of fluid passage 30 and suitable fluid passage means, not shown.

In operation, when the spool 11 is moved forwardly from its neutral position as shown in FIGURE 2, the cylindrical load check 19 is operable in the work cycle to provide fluid under pressure to the area in the work cylinder 26 below the piston 25 by way of the fluid passages 27, 28 and 23; the cylindrical load check 19 being unseated by fluid pressure there against.

It is apparent that in this cycle the plus pressure is below the piston 25 and the negative pressure above it, hence no vacuum is being pulled and consequently the anticavitation valve 15 has not become operative. The fluid above the piston 25 of course returns to the fluid reservoir by way of the fluid passages 24 and 29.

Returning the spool 11 to its neutral position stops the flow of hydraulic fluid with respect to the work cylinder 26 and the piston 25 remains stationary.

When the spool 11 is now moved forward from its neutral position, fluid under pressure is again provided by way of the pump fluid passage 27 which unseats the cylindrical load check 19 thereby providing fluid under pressure to the area in the work cylinder 26 above the piston 25 by way of fluid passages 28 and 24 thereby moving the piston 25 downward, forcing the fluid therefrom to flow through the fluid passages 23 and 30, whereby pressure is exerted against the annular shoulder 16a which unseats the anticavitation valve 15, thereby permitting the fluid to flow therethrough into the cylindrical load check 19 and thence through the openings 31, and mingle with the hydraulic fluid in the fluid passage 28.

In this cycle, if the flow of the return fluid were uncontrolled, a tendency to pull a vacuum above the piston 25 would produce cavitation. The anticavitation valve 15 controls the return flow in a manner so as to prevent cavitation. In explanation of its operation it should be noted that under normal pressure conditions in the return passages, the spring 21 is of a value such as to hold the anticavitation valve 15 against the seat when opposed by the normal return pressure times the effective area which is the differential area between the reduced diameter 16 and the over-all diameter of the anticavitation valve 15. Therefore when the value of the load in the area of the work cylinder 26, below the piston 25, is sufficient to create a plus with a negative pressure on the opposite side, the volume of the return fluid will increase several times. This condition increases the pressure in the return passages and this pressure times effective area of the anticavitation valve 15 overcomes the spring 21 which permits the return oil to flow through the anticavitation valve 15 into the cylindrical load check 19 and out through the openings 31 to the fluid passage 28. The pump flow from the pump fluid passage 27 is furnishing oil at this time through the cylindrical load check 19 (which has been unseated) to the fluid passage 28 thus mingling with the fluid from the pump fluid passage 27 on its way to the area in the cylinder 26 above the piston 25 which is the negative pressure side at this time.

I claim:
1. A valve device comprising in combination;
   (a) a valve body,
   (b) a spool bore in said valve body,
   (c) a spool reciprocally operable in said spool bore,
   (d) an anticavitation and load check bore in said valve body,
   (e) an open ended anticavitation valve operable in one end of said anticavitation and load check bore is provided with a reduced diameter at its forward end thereby providing an annular shoulder,
   (f) a floating seat in the forward end of said anticavitation and load check bore,
   (g) a cylindrical load check in contiguous alignment with said open ended anticavitation valve, also operable in said one end of said anticavitation and load check bore, is provided with a bore therein carrying a spring which is in biased engagement with said open ended anticavitation valve, whereby said reduced diameter is seated against said floating seat and said cylindrical load check is seated against a load check seat,
   (h) an opening in said cylindrical load check in communication with a first fluid passage which is in communication with said spool bore,
   (i) a second fluid passage in communication with said spool bore and said anticavitation and load check bore whereby pressure build up in said second fluid passage is exerted against said annular shoulder thereby unseating said anticavitation valve, and
   (j) a fluid pump passage in fluid communication with said other end of said anticavitation and load check bore.

2. In a spool valve device comprising in combination;
   (a) a spool valve body provided with first and second bores therein,
   (b) a spool reciprocally operable in said first bore,
   (c) a cylindrical anticavitation valve having an axial bore extending therethrough and having a reduced diameter at its forward end thereby providing an annular shoulder,
   (d) a cylindrical load check having a transverse opening therethrough, said cylindrical anticavitation valve and said cylindrical load check being in contiguous alignment and reciprocally operable in said second bore,
   (e) a first seat operably associated with said anticavitation valve,
   (f) a second seat operably associated with said load check,
   (g) a spring interposed between said anticavitation valve and said load check thereby urging said anticavitation valve and load check in opposite directions into engagement with said first and second seats respectively, and
   (h) fluid communication means between said first and second bores.

3. A flow control valve according to claim 2 wherein the said first seat is a floating seat.

4. A flow control valve according to claim 2 wherein the said cylindrical anticavitation valve is provided with a fluid sealing means at its outer periphery.

5. A flow control valve according to claim 2 wherein the said floating seat is provided with an annular groove at its outer periphery.

References Cited by the Examiner

UNITED STATES PATENTS 3,216,446   11/1965   Schmiel _____ 137—596

WILLIAM F. O'DEA, *Primary Examiner.*

H. M. COHN, *Assistant Examiner.*